United States Patent
Vogelsang et al.

(10) Patent No.: US 12,054,581 B2
(45) Date of Patent: Aug. 6, 2024

(54) METHOD FOR PRODUCING A POLYOXYALKYLENE POLYESTER POLYOL

(71) Applicant: Covestro Intellectual Property GmbH & Co. KG, Leverkusen (DE)

(72) Inventors: Elisabeth Vogelsang, Cologne (DE); Joerg Hofmann, Krefeld (DE); Marina Reithmeier, Cologne (DE); Philipp Sander, Grevenbroich (DE); Sascha Froebel, Düsseldorf (DE); Klaus Lorenz, Dormagen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 469 days.

(21) Appl. No.: 17/312,547

(22) PCT Filed: Dec. 18, 2019

(86) PCT No.: PCT/EP2019/086092
§ 371 (c)(1),
(2) Date: Jun. 10, 2021

(87) PCT Pub. No.: WO2020/127582
PCT Pub. Date: Jun. 25, 2020

(65) Prior Publication Data
US 2022/0033575 A1 Feb. 3, 2022

(30) Foreign Application Priority Data
Dec. 21, 2018 (EP) ..................... 18215191

(51) Int. Cl.
C08G 63/664 (2006.01)
C08G 63/64 (2006.01)
C08G 63/82 (2006.01)
C08L 75/06 (2006.01)

(52) U.S. Cl.
CPC ........... *C08G 63/664* (2013.01); *C08G 63/64* (2013.01); *C08G 63/823* (2013.01); *C08L 75/06* (2013.01)

(58) Field of Classification Search
CPC .................................................. C08G 63/664
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Johnston |
| 3,941,849 A | 3/1976 | Herold |
| 5,032,671 A | 7/1991 | Harper |
| 5,158,922 A | 10/1992 | Hinney et al. |
| 5,470,813 A | 11/1995 | Le-Khac |
| 5,482,908 A | 1/1996 | Le-Khac |
| 5,536,883 A | 7/1996 | Le-Khac |
| 5,545,601 A | 8/1996 | Le-Khac |
| 5,627,120 A | 5/1997 | Le-Khac |
| 5,637,673 A | 6/1997 | Le-Khac |
| 5,712,216 A | 1/1998 | Le-Khac et al. |
| 5,714,428 A | 2/1998 | Le-Khac |
| 5,789,626 A | 8/1998 | Le-Khac |
| 6,018,017 A | 1/2000 | Le-Khac |
| 6,767,986 B2 | 7/2004 | Moethrath et al. |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 7,304,172 B2 | 12/2007 | Coates et al. |
| 8,883,957 B2 | 11/2014 | Magnet et al. |
| 9,029,495 B2 | 5/2015 | Nefzger et al. |
| 2010/0121024 A1* | 5/2010 | Magnet ............... D01F 6/78 528/354 |
| 2012/0046437 A1* | 2/2012 | Coady ................. C08G 75/28 528/336 |
| 2012/0165549 A1 | 6/2012 | Ok et al. |
| 2012/0196999 A1 | 8/2012 | Nefzger et al. |

FOREIGN PATENT DOCUMENTS

| | | |
|---|---|---|
| GB | 1201909 A | 8/1970 |
| JP | 4145123 B2 | 9/2008 |

OTHER PUBLICATIONS

Pothupitiya et al., H-Bonding Organocatalysts for the Living, Solvent-Free Ring-Opening Polymerization of Lactones: Toward an All-Lactones, All-Conditions Approach, 2017, Macromolecules, 50 (22), 8948-8954 (Year: 2017).*

Huang et al., Ring-Opening Polymerization of Propylene Oxide Catalyzed by a Calcium-Chloride-Modified Zinc-Cobalt Double Metal-Cyanide Complex, 2010, Macromolecular Chemistry and Physics, 211, 1229-1237 (Year: 2010).*

Hu, Yong et al, "Degradation Behavior of Poly([epsilon]-caprolactone) Micelles in Aqueous Solution", Biomacromolecules, Bd. 5, Nr. 5, Seiten 1756-1762, XP055560549 *Seite 1757; Abbildung 1*, Sep. 1, 2004.

Aldrich Sigma, "Sigma-Aldrich", Gefunden im Internet: URL:http://www.sigmaaldrich.com/catalog/product/aldrich/570303 ; *Seite 1*; XP055560629, Feb. 23, 2017.

(Continued)

*Primary Examiner* — Shane Fang
(74) *Attorney, Agent, or Firm* — Donald R. Palladino

(57) ABSTRACT

The invention relates to a method for producing a polyoxyalkylene polyester polyol by reacting a polyoxyalkylene polyol with a lactone in the presence of a Brønsted acid catalyst, wherein the catalyst has a pKa value of 1 or less; the number-average molar mass of the polyoxyalkylene polyol is ≥1000 g/mol, preferably ≥1500 g/mol, particularly preferably ≥2000 g/mol; and in the lactone a CH2 group is bonded to the ring oxygen. The invention further relates to polyoxyalkylene polyester polyols obtainable using the method according to the invention, and to a method for producing polyurethanes by reacting the polyoxyalkylene polyester polyols according to the invention with polyisocyanates.

12 Claims, No Drawings

(56) References Cited

OTHER PUBLICATIONS

Couffin et al. Poly. Chem 2014, 5, 161.
Chisholm, M.H. et al., Macromolecules 2002, 35, 6494.
Allen, S. D., J. Am. Chem. Soc. 2002, 124, 14284.
Kember, M.R. et al., Chemical Communications 47 (2011) 141-163.
International Search Report, PCT/EP2019/086092, date of mailing: Feb. 13, 2020.

* cited by examiner

METHOD FOR PRODUCING A POLYOXYALKYLENE POLYESTER POLYOL

CROSS-REFERENCE TO RELATED APPLICATION

This application is a national stage application under 35 U.S.C. § 371 of PCT/EP2019/086092, filed Dec. 18, 2019, which claims the benefit of European Application No. 18215191.0, filed Dec. 21, 2018, each of which is incorporated herein by reference.

FIELD

The invention provides a process for preparing a polyoxyalkylene polyester polyol by reaction of a polyoxyalkylene polyol with a lactone in the presence of a Brønsted-acidic catalyst, wherein the catalyst has a pKa of 1 or less, wherein the number-average molar mass of the polyoxyalkylene polyol is ≥1000 g/mol, preferably ≥1500 g/mol, particularly preferably ≥2000 g/mol, and wherein in the lactone a $CH_2$ group is bonded to the ring oxygen. The invention further provides polyoxyalkylene polyester polyols obtainable by the process according to the invention and a process for preparing polyurethanes by reaction of the polyoxyalkylene polyester polyols according to the invention with polyisocyanates.

BACKGROUND

WO2008/104723 A1 discloses a process for preparing a polylactone or polylactam, wherein the lactone or lactam is reacted with an H-functional starter substance in the presence of a non-chlorinated aromatic solvent and a sulfonic acid on a microliter scale. Employed here as the H-functional starter substance are low molecular weight monofunctional or polyfunctional alcohols or thiols, wherein the working examples disclose n-pentanol with ε-caprolactone or δ-valerolactone in the presence of large amounts of trifluoromethanesulfonic acid of 2.5 mol % or more.

Couffin et al. Poly. Chem 2014, 5, 161 disclose a selective O-acyl opening of β-butyrolactone with H-functional starter substances such as for example n-pentanol, butane-1,4-diol and polyethylene glycol in deuterated benzene and in the presence of trifluoromethanesulfonic acid in a batch mode. The reactions are performed here on a microliter scale and large amounts of the acid catalyst of 1 mol % or more based on the amount of employed lactone are used.

U.S. Pat. No. 5,032,671 discloses a process for preparing polymeric lactones by reaction of an H-functional starter substance and lactones in the presence of a double metal cyanide (DMC) catalyst. The working examples disclose the reaction of polyether polyols with ε-caprolactone, δ-valerolactone or β-propiolactone to afford polyether-polyester polyol block copolymers, wherein these reactions are performed in the presence of large amounts of the cobalt-containing DMC catalyst of 980 ppm to 1000 ppm and in the presence of organic solvents, wherein the resulting products have a broad molar mass distribution of 1.32 to 1.72. This process further requires a workup step wherein the products are filtered through diatomaceous earth and the solvent is subsequently removed.

GB1201909 likewise discloses a process for preparing polyesters by reaction of a lactone with an H-functional starter compound in the presence of an organic carboxylic acid or sulfonic acid having a pKa at 25° C. of less than 2.0. All reaction components such as short-chain alcohols and ε-caprolactone or mixtures of isomeric methyl-epsilon-caprolactones are initially charged in large amounts of trichloro- or trifluoroacetic acid catalyst and reacted in a batch process for at least 20 hours, resulting in solids or liquid products.

WO 2011/000560 A1 discloses a process for preparing polyether ester polyols having primary hydroxyl end groups, comprising the steps of reacting a starter compound comprising active hydrogen atoms with an epoxide under double metal cyanide catalysis, reacting the obtained product with a cyclic carboxylic anhydride and reacting this obtained product with ethylene oxide in the presence of a catalyst comprising at least one nitrogen atom per molecule with the exception of acyclic, identically substituted tertiary amines. The resulting polyether ester polyols from this multistage process have a proportion of primary hydroxyl groups of at most 76%.

Hu et al. Biomacromolecules 2004, 5, 1756-1762 disclose a process for preparing poly(ε-caprolactone)-b-poly(ethylene glycol)-b-poly(ε-caprolactone) triblock copolymers having number-average molar masses of approximately 35 000 g/mol (GPC) by ring-opening polymerization of ε-caprolactone with polyethylene glycols as H-functional starter compounds having molar masses of 2000-10 000 g/mol and which exclusively comprise primary hydroxyl end groups in the presence of a tin octoate catalyst. However, the reaction of starter compounds having primarily or exclusively secondary hydroxyl end groups is not described.

SUMMARY

Proceeding from the prior art, it was therefore an object of the present invention to provide a simplified and preferably single-stage process for preparing long-chain polyoxyalkylene polyester polyols having a number-average molar mass of at least 1200 g/mol and a proportion of primary hydroxyl groups of ≥80%, based on the sum total of primary and secondary terminal hydroxyl groups. The resulting polyols should have narrow number-average molar mass distributions with polydispersity indices (PDIs) of less than or equal to 1.2. In addition, this process should use minimal amounts of a highly reactive, heavy metal-free catalyst, meaning that it is preferably not necessary to remove the catalyst prior to further processing. Furthermore, the use of the process according to the invention should also make it possible to react starter compounds having primarily or exclusively secondary hydroxyl end groups, resulting in polyoxyalkylene polyester polyols having a number-average molar mass of at least 1200 g/mol and a proportion of primary hydroxyl groups of ≥80%, based on the sum total of primary and secondary terminal hydroxyl groups.

Surprisingly, it has been found that the technical object is achieved by a process for preparing a polyoxyalkylene polyester polyol by reaction of a polyoxyalkylene polyol with a lactone in the presence of a Brønsted-acidic catalyst, wherein the catalyst has a pKa of 1 or less, wherein the number-average molar mass of the polyoxyalkylene polyol is ≥1000 g/mol, preferably ≥1500 g/mol, particularly preferably ≥2000 g/mol, and wherein in the lactone a $CH_2$ group is bonded to the ring oxygen.

In the process according to the invention, the number-average molar mass, for example of the polyoxyalkylene polyols and of the polyoxyalkylene polyester polyols according to the invention, is determined by means of gel permeation chromatography (GPC) as disclosed in the experimental section.

DETAILED DESCRIPTION

Polyoxyalkylene Polyol

In the process according to the invention, the number-average molar mass of the polyoxyalkylene polyol is ≥1000 g/mol, preferably ≥1500 g/mol and particularly preferably ≥2000 g/mol.

In the process according to the invention, the number-average molar mass of the polyoxyalkylene polyol is ≤30 000 g/mol, preferably ≤25 000 g/mol and particularly preferably ≤20 000 g/mol.

In a preferred embodiment of the process according to the invention, the number-average molar mass of the polyoxyalkylene polyol is ≥1000 g/mol to ≤30 000 g/mol, preferably ≥1500 g/mol to ≤25 000 g/mol and particularly preferably ≥2000 g/mol to ≤20 000 g/mol.

The polyoxyalkylene polyol generally has an OH functionality (i.e. the number of hydrogen atoms active in respect of the polymerization per molecule) of 2 to 8, preferably of 2 to 6 and particularly preferably of 2 to 4. The polyoxyalkylene polyol can be used either individually or as a mixture of at least two polyoxyalkylene polyols.

The polyoxyalkylene polyol can for example be one or more compounds selected from the group comprising polyether polyols, polyester polyols, polyester ether polyols, polyether carbonate polyols, polycarbonate polyols, polytetrahydrofurans (e.g. PolyTHF® from BASF, such as for example PolyTHF® 1000, 1000S, 1400, 1800, 2000).

In one embodiment of the process according to the invention, the polyoxyalkylene polyol has a proportion of secondary OH end groups of at least 75%, based on the sum total of primary and secondary OH end groups, wherein the secondary OH end groups have been determined by means of 1H NMR spectroscopy as disclosed in the experimental section.

In one embodiment of the invention, the polyoxyalkylene polyols may be selected from the substance class of the polyether polyols. Preference is given to polyether polyols formed from repeating ethylene oxide and propylene oxide units, preferably having a proportion of propylene oxide units of 50% to 100%, particularly preferably having a proportion of propylene oxide units of 80% to 100%. These may be random copolymers, gradient copolymers, alternating copolymers or block copolymers of ethylene oxide and propylene oxide. Suitable polyether polyols formed from repeating propylene oxide and/or ethylene oxide units are for example the Desmophen®, Acclaim®, Arcol®, Baycoll®, Bayfill®, Bayflex®, Baygal®, PET® and Polyether polyols from Covestro AG (e.g. Desmophen® 3600Z, Desmophen® 1900U, Acclaim® Polyol 2200, Acclaim® Polyol 40001, Arcol® Polyol 1010, Arcol® Polyol 1030, Arcol® Polyol 1070, Baycoll® BD 1110, Bayfill® VPPU 0789, Baygal® K55, Polyether® S180). Further suitable homopolypropylene oxides are for example the Pluriol® P products from BASF SE, suitable mixed copolymers of ethylene oxide and propylene oxide are for example the Pluronic® PE or Pluriol® RPE products from BASF SE.

In one embodiment of the invention, the polyoxyalkylene polyols may be selected from the substance class of the polyester polyols, especially those having a molecular weight Mn in the range from 1000 to 4500 g/mol. Polyester polyols used may be at least difunctional polyesters. Polyester polyols preferably consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, propane-1,2-diol, propane-1,3-diol, butane-1,4-diol, pentane-1,5-diol, neopentyl glycol, hexane-1,6-diol, 1,4-bis(hydroxymethyl) cyclohexane, diethylene glycol, dipropylene glycol, trimethylolpropane, glycerol, pentaerythritol, or mixtures of the stated alcohols. Using dihydric or polyhydric polyether polyols as the alcohol component affords polyester ether polyols which may likewise be used as starter substances for preparation of the polyoxyalkylene polyester polyols. It is preferable to use polyether polyols having Mn=150 to 2000 g/mol for preparation of the polyester ether polyols.

In one embodiment of the invention, the polyoxyalkylene polyols may be selected from the substance class of the polycarbonate diols, in particular those having a molecular weight Mn in the range from 1000 to 4500 g/mol, preferably 1500 to 2500 g/mol, prepared, for example, by reaction of phosgene, dimethyl carbonate, diethyl carbonate or diphenyl carbonate and difunctional alcohols or polyester polyols or polyether polyols. Examples for polycarbonates can be found, for example, in EP-A 1359177. Polycarbonate diols that may be used include for example the Desmophen® C line from Covestro AG, for example Desmophen® C 1100 or Desmophen® C 2200.

In a further embodiment of the invention, the polyoxyalkylene polyols may be selected from the substance class of the polyether carbonate polyols (for example Cardyon® polyols from Covestro), polycarbonate polyols (for example Converge® polyols from Novomer/Saudi Aramco, NEOSPOL polyols from Repsol etc.) and/or polyether ester carbonate polyols. In particular, polyether carbonate polyols, polycarbonate polyols and/or polyether ester carbonate polyols may be obtained by reaction of alkylene oxides, preferably ethylene oxide, propylene oxide or mixtures thereof, optionally further comonomers, with CO2 in the presence of an H-functional starter substance and using catalysts. These catalysts include double metal cyanide catalysts (DMC catalysts) and/or metal complex catalysts for example based on the metals zinc and/or cobalt, for example zinc glutarate catalysts (described for example in M. H. Chisholm et al., Macromolecules 2002, 35, 6494), so-called zinc diiminate catalysts (described for example in S. D. Allen, J. Am. Chem. Soc. 2002, 124, 14284) and so-called cobalt salen catalysts (described for example in U.S. Pat. No. 7,304,172 B2, US 2012/0165549 A1) and/or manganese salen complexes. An overview of the known catalysts for the copolymerization of alkylene oxides and CO2 may be found for example in Chemical Communications 47 (2011) 141-163. The use of different catalyst systems, reaction conditions and/or reaction sequences results in the formation of random, alternating, block-type or gradient-type polyether carbonate polyols, polycarbonate polyols and/or polyether ester carbonate polyols. To this end, these polyether carbonate polyols, polycarbonate polyols and/or polyether ester carbonate polyols may be prepared beforehand in a separate reaction step.

In a preferred embodiment of the process according to the invention, the polyoxyalkylene polyol is a polyether polyol and/or polyether carbonate polyol.

In one embodiment of the process according to the invention, the polyoxyalkylene polyol is a polyether polyol, wherein the polyether polyol has a number-average molar mass of ≥1000 g/mol, preferably ≥1500 g/mol and particularly preferably ≥2000 g/mol.

In one embodiment of the process according to the invention, the polyoxyalkylene polyol is a polyether polyol, wherein the polyether polyol has a number-average molar mass of ≤30 000 g/mol, preferably ≤25 000 g/mol and particularly preferably ≤20 000 g/mol.

In one embodiment of the process according to the invention, the polyoxyalkylene polyol is a polyether polyol, wherein the polyether polyol has a number-average molar mass of ≥1000 g/mol to ≤30 000 g/mol, preferably ≥1500 g/mol to ≤25 000 g/mol and particularly preferably ≥2000 g/mol to ≤20 000 g/mol.

In a preferred embodiment of the process according to the invention, the polyoxyalkylene polyol is a polyether polyol, wherein the polyether polyol has been prepared by reaction of an H-functional starter substance with alkylene oxides in the presence of a double metal cyanide catalyst. The products obtained after reaction with the lactone are referred to hereinafter as polyether polyester polyols.

In one embodiment of the process according to the invention, the polyoxyalkylene polyol is a polyether carbonate polyol, wherein the polyether carbonate polyol has a number-average molar mass of ≥1000 g/mol, preferably ≤1500 g/mol and particularly preferably ≤2000 g/mol.

In one embodiment of the process according to the invention, the polyoxyalkylene polyol is a polyether carbonate polyol, wherein the polyether carbonate polyol has a number-average molar mass of ≤30 000 g/mol, preferably ≤25 000 g/mol and particularly preferably ≤20 000 g/mol.

In one embodiment of the process according to the invention, the polyoxyalkylene polyol is a polyether carbonate polyol, wherein the polyether carbonate polyol has a number-average molar mass of ≥1000 g/mol to ≤30 000 g/mol, preferably ≥1500 g/mol to ≤25 000 g/mol and particularly preferably ≥2000 g/mol to ≤20 000 g/mol.

In a further preferred embodiment of the process according to the invention, the polyoxyalkylene polyol is a polyether carbonate polyol, wherein the polyether carbonate polyol has been prepared by reaction of an H-functional starter substance with alkylene oxides and carbon dioxide in the presence of a double metal cyanide catalyst. The products obtained after reaction with the lactone are referred to hereinafter as polyether carbonate polyester polyols.

Double Metal Cyanide (DMC) Catalyst

The DMC catalysts which can be used with preference in the process according to the invention contain double metal cyanide compounds which are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts described, for example, in U.S. Pat. No. 5,470,813, EP-A 700 949, EP-A 743 093, EP-A 761 708, WO 97/40086, WO 98/16310 and WO 00/47649 have a very high activity and enable the preparation of polyoxyalkylene polyols at very low catalyst concentrations. A typical example is that of the highly active DMC catalysts described in EP-A 700 949 which, as well as a double metal cyanide compound (e.g. zinc hexacyanocobaltate(III)) and an organic complex ligand (e.g. tert-butanol), also contain a polyether having a number-average molecular weight greater than 500 g/mol.

The DMC catalysts which can be used in accordance with the invention are preferably obtained by (1.) in a first step, reacting an aqueous solution of a metal salt with the aqueous solution of a metal cyanide salt in the presence of one or more organic complex ligands, e.g. an ether or alcohol, (2.) in a second step, using known techniques (such as centrifugation or filtration) to remove the solid from the suspension obtained from (1.), (3.) optionally, in a third step, washing the isolated solid with an aqueous solution of an organic complex ligand (for example by resuspension and subsequent reisolation by filtration or centrifugation), (4.) and subsequently drying the solid obtained, optionally after pulverizing, at temperatures of in general 20-120° C. and at pressures of in general 0.1 mbar to standard pressure (1013 mbar), wherein, in the first step or immediately after the precipitation of the double metal cyanide compound (second step), one or more organic complex ligands, preferably in excess (based on the double metal cyanide compound), and optionally further complex-forming components are added.

The double metal cyanide compounds present in the DMC catalysts which can be used in accordance with the invention are the reaction products of water-soluble metal salts and water-soluble metal cyanide salts.

By way of example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparing the double metal cyanide compounds preferably have a composition according to the general formula (1), $$M(X)_n \qquad (I),$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (11)

$$M_r(X)_3 \qquad (II),$$

where

M is selected from the metal cations $Fe^{3+}$, $Al^{3+}$, $Co^{3+}$ and $Cr^{3+}$, X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts preferably have a composition according to the general formula (III)

$$M(X)_s \qquad (III),$$

where

M is selected from the metal cations $Mo^{4+}$, $V^{4+}$ and $W^{4+}$,

X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts preferably have a composition according to the general formula (IV)

$$M(X)_t \quad (IV),$$

where

M is selected from the metal cations $Mo^{6+}$ and $W^{6+}$,

X comprises one or more (i.e. different) anions, preferably anions selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (V)

$$(Y)_a M'(CN)_b (A)_c \quad (V),$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^{30}$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and a, b and c are integers, wherein the values for a, b and c are selected such as to ensure the electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts which can be used in accordance with the invention are compounds having compositions according to the general formula (VI)

$$M_x[M'_{x'}(CN)_y]_z \quad (VI),$$

in which M is defined as in the formulae (I) to (IV) and M' is as defined in formula (V), and x, x', y and z are integers and are selected such as to ensure the electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds (VI) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III). The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, organic complex ligands used are water-soluble organic compounds having heteroatoms, such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts which can be used in accordance with the invention, there is optional use of one or more complex-forming components from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, bile acids or salts, esters or amides thereof, cyclodextrins, phosphorus compounds, α,β-unsaturated carboxylic esters, or ionic surface-active or interface-active compounds.

In the preparation of the DMC catalysts which can be used in accordance with the invention, preference is given to using the aqueous solutions of the metal salt (e.g. zinc chloride) in the first step in a stoichiometric excess (at least 50 mol %) relative to the metal cyanide salt. This corresponds to at least a molar ratio of metal salt to metal cyanide salt of 2.25:1.00. The metal cyanide salt (e.g. potassium hexacyanocobaltate) is reacted in the presence of the organic complex ligand (e.g. tert-butanol), and a suspension is formed which comprises the double metal cyanide compound (e.g. zinc hexacyanocobaltate), water, excess metal salt, and the organic complex ligand.

The organic complex ligand may be present here in the aqueous solution of the metal salt and/or the metal cyanide salt, or it is added directly to the suspension obtained after precipitation of the double metal cyanide compound. It has proven to be advantageous to mix the metal salt and metal cyanide salt aqueous solutions and the organic complex ligand by stirring vigorously. Optionally, the suspension formed in the first step is subsequently treated with a further complex-forming component. This complex-forming component is preferably used in a mixture with water and organic complex ligand. A preferred process for performing the first step (i.e. the preparation of the suspension) is effected using a mixing nozzle, particularly preferably using a jet disperser, as described, for example, in WO-A 01/39883.

In the second step, the solid (i.e. the precursor of the catalyst) can be isolated from the suspension by known techniques, such as centrifugation or filtration.

In a preferred variant of the embodiment, the isolated solid is then washed with an aqueous solution of the organic complex ligand (for example by resuspension and subsequent reisolation by filtration or centrifugation) in a third process step. In this way, for example, water-soluble by-products, such as potassium chloride, can be removed from the catalyst which can be used in accordance with the invention. The amount of the organic complex ligand in the aqueous wash solution is preferably between 40% and 80% by weight, based on the overall solution.

Optionally in the third step the aqueous wash solution is admixed with a further complex-forming component, preferably in the range between 0.5% and 5% by weight, based on the overall solution.

It is also advantageous to wash the isolated solid more than once. Preferably, in a first wash step (3.-1), an aqueous solution of the organic complex ligand is used for washing (for example by resuspension and subsequent reisolation by filtration or centrifugation), in order in this way to remove, for example, water-soluble by-products such as potassium chloride from the catalyst which can be used in accordance with the invention. It is particularly preferable when the amount of the organic complex ligand in the aqueous wash solution is between 40% and 80% by weight based on the overall solution for the first wash step. In the further wash steps (3.-2), either the first wash step is repeated once or more than once, preferably once to three times, or, preferably, a nonaqueous solution, for example a mixture or solution of organic complex ligands and further complex-forming component (preferably in the range between 0.5% and 5% by weight, based on the total amount of the wash solution in the step(3.-2)), is used as a wash solution to wash the solid once or more than once, preferably once to three times.

The isolated and optionally washed solid can then be dried, optionally after pulverization, at temperatures of 20-100° C. and at pressures of 0.1 mbar to standard pressure (1013 mbar). One preferred method for isolating the DMC catalysts which can be used in accordance with the invention from the suspension by filtration, filtercake washing and drying is described in WO-A 01/80994.

H-functional Starter Substance

Suitable H-functional starter substances (starters) used may be compounds having hydrogen atoms that are active in respect of the alkoxylation. Groups active in respect of alkoxylation and having active hydrogen atoms are for example —OH, —SH and —CO₂H, preferably —OH. As H-functional starter substance, one or more compounds may for example be selected from the group comprising polyhydric alcohols, polyhydric thiols, thio alcohols, hydroxy esters, polyether polyols, polyester polyols, polyester ether polyols, polyether carbonate polyols, polycarbonate polyols, polycarbonates.

Examples of polyhydric alcohols suitable as H-functional starter substances are dihydric alcohols (such as, for example, ethylene glycol, diethylene glycol, 1,2-propylene glycol, dipropylene glycol, propane-1,3-diol, butane-1,4-diol, butene-1,4-diol, butyne-1,4-diol, neopentyl glycol, pentanetane-1,5-diol, methylpentanediols (such as, for example, 3-methylpentane-1,5-diol), hexane-1,6-diol, octane-1,8-diol, decane-1,10-diol, dodecane-1,12-diol, bis (hydroxymethyl)cyclohexanes (such as, for example, 1,4-bis(hydroxymethyl)cyclohexane), triethylene glycol, tetra-ethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolyzates, cellulose, cellulose hydrolyzates, hydroxy-functionalized fats and oils, especially castor oil), and also all modification products of these aforementioned alcohols with different amounts of ε-caprolactone.

The H-functional starter substances may also be selected from the substance class of the polyether polyols, especially those having a molecular weight $M_n$ in the range from 100 to 1000 g/mol. Preference is given to polyether polyols formed from repeating ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Examples of suitable polyether polyols formed from repeating propylene oxide and/or ethylene oxide units include Desmophen®, Acclaim®, Arcol®, Baycoll®, Bayfill®, Bayflex®, Baygar, PET® and Polyether polyols from Covestro AG (PET® 1004, PET® 1110N). Further suitable homopolypropylene oxides are for example the Pluriol® P products from BASF SE, suitable mixed copolymers of ethylene oxide and propylene oxide are for example the Pluronic® PE or Pluriol® RPE products from BASF SE.

The H-functional starter substances may also be selected from the substance class of the polyester polyols, especially those having a molecular weight $M_n$ in the range from 200 to 1000 g/mol. Polyester polyols used may be at least difunctional polyesters. Polyester polyols preferably consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol, or mixtures of the stated alcohols.

In addition, H-functional starter substances used may be polycarbonate diols, especially those having a molecular weight $M_n$ in the range from 150 to 1000 g/mol which are prepared, for example, by reaction of phosgene, dimethyl carbonate, diethyl carbonate or diphenyl carbonate and difunctional alcohols or polyester polyols or polyether polyols. Examples for polycarbonates can be found, for example, in EP-A 1359177. Examples of polycarbonate diols which can be used include the Desmophen® C products from Covestro AG. In a further embodiment of the invention, polyether carbonate polyols and/or polyether ester carbonate polyols can be used as H-functional starter substances.

The H-functional starter substances generally have an OH functionality (i.e. the number of hydrogen atoms active in respect of the polymerization per molecule) of 2 to 8, preferably of 2 to 6 and particularly preferably of 2 to 4. The H-functional starter substances are used either individually or as a mixture of at least two H-functional starter substances.

Preferred H-functional starter substances are ethylene glycol, propylene glycol, diethylene glycol, trimethylolpropane, glycerol, sorbitol, polyether polyols and polyether carbonate polyols.

In a preferred embodiment of the process according to the invention, the alkylene oxide is ethylene oxide and/or propylene oxide.

In a preferred embodiment of the process according to the invention, the proportion by weight of propylene oxide is 80% by weight to 100% by weight based on the sum total of the masses of propylene oxide and of ethylene oxide metered in.

Lactone

According to the technical generally valid understanding in organic chemistry, lactones are to be understood as meaning heterocyclic compounds which are formed by intramolecular esterification, i.e. reaction of a hydroxyl functionality with a carboxyl functionality in a hydroxycarboxylic acid. They are therefore cyclic esters having a ring oxygen.

In the process according to the invention, a $CH_2$ group is bonded to the ring oxygen in the lactone.

In a preferred embodiment of the process according to the invention, the lactone is one or more compounds and is selected from the group consisting of beta-propiolactone, gamma-butyrolactone, delta-valerolactone and epsilon-caprolactone.

In a particularly preferred embodiment of the process according to the invention, the lactone is beta-propiolactone.

In a preferred embodiment of the process according to the invention, the molar ratio of lactone to the hydroxyl end groups of the polyoxyalkylene polyol is 1:1 to 20:1, preferably from 1.5:1 to 10:1 and particularly preferably from 2:1 to 6:1.

Brønsted-acidic Catalyst

In line with the customary definition in the art, Brønsted acids are to be understood as meaning substances capable of transferring protons to a second reaction partner, the so-called Brønsted base. In the context of the present invention, the term "Brønsted-acidic catalyst" is to be understood as meaning a non-polymeric compound, wherein the Brønsted-acidic catalyst has a calculated molar mass of ≤1200 g/mol, preferably of ≤1000 g/mol and particularly preferably of ≤850 g/mol.

In the process according to the invention, the Brønsted-acidic catalyst has a pKa of 1 or less, preferably of less than or equal to zero.

The Brønsted-acidic catalyst is for example selected from one or more compounds from the group consisting of aliphatic fluorinated sulfonic acids, aromatic fluorinated sulfonic acids, trifluoromethanesulfonic acid, perchloric acid, hydrochloric acid, hydrobromic acid, hydroiodic acid, fluorosulfonic acid, bis(trifluoromethane)sulfonimide, hexafluoroantimonic acid, pentacyanocyclopentadiene, picric acid, sulfuric acid, nitric acid, trifluoroacetic acid, trichloroacetic acid, methanesulfonic acid, paratoluenesulfonic acid, aromatic sulfonic acids and aliphatic sulfonic acids.

In a preferred embodiment of the process according to the invention, the Brønsted-acidic catalyst is one or more compounds selected from the group consisting of trifluoromethanesulfonic acid, perchloric acid, hydrochloric acid, hydrobromic acid, hydroiodic acid, sulfuric acid, nitric acid, methanesulfonic acid, trichloroacetic acid and trifluoroacetic acid. The Brønsted-acidic catalyst used is particularly preferably trifluoromethanesulfonic acid.

In one embodiment of the process according to the invention, the Brønsted-acidic catalyst is used in an amount of 0.001 mol % to 0.5 mol %, preferably of 0.003 to 0.4 mol % and particularly preferably of 0.005 to 0.3 mol %, based on the amount of lactone.

Solvent

In line with the customary definition in the art, a solvent is to be understood as meaning one or more compounds which dissolve the lactone or the polyoxyalkylene polyol and/or the Brønsted-acidic catalyst but without themselves reacting with the lactone, the polyoxyalkylene polyol and/or the Brønsted-acidic catalyst.

In one embodiment, the process according to the invention is performed without addition of a solvent and there is therefore no need to remove this solvent in an additional process step after the preparation of the polyoxyalkylene polyester polyol.

In one embodiment of the process according to the invention, the polyoxyalkylene polyol is reacted with the lactone in the presence of the Brønsted-acidic catalyst at temperatures of 20 to 160° C., preferably of 40 to 120° C. and particularly preferably of 50 to 110° C.

In one embodiment of the process according to the invention, the lactone is added continuously or stepwise to the mixture of polyoxyalkylene polyol and Brønsted-acidic catalyst and reacted to afford the polyoxyalkylene polyester polyol (semi-batch mode).

In the process according to the invention, continuous addition of the lactone is to be understood as meaning a volume flow of the lactone of ≤0 ml/min, wherein the volume flow may be constant or may vary during this step (continuous lactone addition).

In an alternative embodiment of the process according to the invention, the lactone is added stepwise to the mixture of polyoxyalkylene polyol and Brønsted-acidic catalyst and then reacted to afford the polyoxyalkylene polyester polyol (stepwise lactone addition).

In the process according to the invention, stepwise addition of the lactone is to be understood as meaning at least the addition of the entire lactone amount in two or more discrete portions of the lactone, wherein the volume flow of the lactone between the two or more discrete portions is 0 ml/min and wherein the volume flow of the lactone during a discrete portion may be constant or may vary but is >0 ml/min.

In an alternative embodiment, the polyoxyalkylene polyol, the lactone and the Brønsted-acidic catalyst are mixed and then the entire mixture is reacted to afford the polyoxyalkylene polyester polyol (batch mode).

In a further, alternative embodiment, the polyoxyalkylene polyol, the lactone and the Brønsted-acidic catalyst are continuously mixed and reacted together while continuously discharging the polyoxyalkylene polyester polyol product, for example in a tubular reactor or a continuous stirred tank reactor, this corresponding to a fully continuous preparation process for the polyoxyalkylene polyester polyol (continuous mode).

The present invention further provides polyoxyalkylene polyester polyols, preferably polyether polyester polyol and/or polyether carbonate polyester polyol, obtainable by the process according to the invention, wherein the polyoxyalkylene polyester polyol has a proportion of primary OH end groups of at least 80%, based on the sum total of primary and secondary OH end groups, wherein the primary OH end groups have been determined by means of $^1$H or $^{13}$C NMR spectroscopy as disclosed in the experimental section.

In one embodiment, the polyoxyalkylene polyester polyol according to the invention, preferably polyether polyester polyol and/or polyether carbonate polyester polyol, has a polydispersity index of ≤1.20, preferably ≤1.15, wherein the polydispersity index has been determined by means of gel permeation chromatography as disclosed in the description.

The present invention further provides a process for preparing a polyurethane by reaction of the polyoxyalkylene polyester polyol according to the invention, preferably the polyether polyester polyol and/or the polyether carbonate polyester polyol, with a polyisocyanate.

The polyisocyanate may be an aliphatic or aromatic polyisocyanate. Examples include butylene 1,4-diisocyanate, pentane 1,5-diisocyanate, hexamethylene 1,6-diisocyanate (HDI) or their dimers, trimers, pentamers, heptamers or nonamers or mixtures thereof, isophorone diisocyanate (IPDI), 2,2,4- and/or 2,4,4-trimethylhexamethylene diisocyanate, isomeric bis(4,4'-isocyanatocyclohexyl)methanes or mixtures thereof having any desired isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) having C1 to C6 alkyl groups.

In addition to the abovementioned polyisocyanates, it is also possible to co-use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyloctane 1,8-diisocyanate (nonane triisocyanate) or triphenylmethane 4,4',4''-triisocyanate.

In a first embodiment, the invention relates to a process for preparing a polyoxyalkylene polyester polyol by reaction of a polyoxyalkylene polyol with a lactone in the presence of a Brønsted-acidic catalyst, wherein the catalyst has a pKa of 1 or less, wherein the number-average molar mass of the polyoxyalkylene polyol is ≥1000 g/mol, preferably ≥1500 g/mol, particularly preferably ≥2000 g/mol, and wherein in the lactone a CH2 group is bonded to the ring oxygen.

In a second embodiment, the invention relates to a process according to the first embodiment, wherein the lactone is one or more compounds and is selected from the group consisting of beta-propiolactone, gamma-butyrolactone, delta-valerolactone and epsilon-caprolactone, preferably beta-propiolactone.

In a third embodiment, the invention relates to a process according to the first or second embodiment, wherein the molar ratio of lactone to the hydroxyl end groups of the polyoxyalkylene polyol is 1:1 to 20:1, preferably from 1.5:1 to 10:1 and particularly preferably from 2:1 to 6:1.

In a fourth embodiment, the invention relates to a process according to any of the first to third embodiments, wherein the Brønsted-acidic catalyst is one or more compounds and is selected from the group consisting of trifluoromethanesulfonic acid, perchloric acid, hydrochloric acid, hydrobromic acid, hydroiodic acid, sulfuric acid, nitric acid, methanesulfonic acid, trichloroacetic acid and trifluoroacetic acid, preferably trifluoromethanesulfonic acid.

In a fifth embodiment, the invention relates to a process according to the first to fourth embodiments, wherein the Brønsted-acidic catalyst is used in an amount of 0.001 mol % to 0.5 mol %, preferably of 0.003 to 0.4 mol % and particularly preferably of 0.005 to 0.3 mol %, based on the amount of lactone.

In a sixth embodiment, the invention relates to a process according to the first to sixth embodiments, wherein the polyoxyalkylene polyol has a proportion of secondary OH end groups of at least 75%, based on the sum total of primary and secondary OH end groups, wherein the secondary OH end groups have been determined by means of 1H NMR spectroscopy as disclosed in the experimental section.

In a seventh embodiment, the invention relates to a process according to any of the first to sixth embodiments, wherein the polyoxyalkylene polyol is a polyether polyol and/or polyether carbonate polyol.

In an eighth embodiment, the invention relates to a process according to the seventh embodiment, wherein the polyoxyalkylene polyol is a polyether polyol and the polyether polyol has been prepared by reaction of an H-functional starter substance with alkylene oxides in the presence of a double metal cyanide catalyst.

In a ninth embodiment, the invention relates to a process according to the seventh embodiment, wherein the polyoxyalkylene polyol is a polyether carbonate polyol and the polyether carbonate polyol has been prepared by reaction of an H-functional starter substance with alkylene oxides and carbon dioxide in the presence of a double metal cyanide catalyst.

In a tenth embodiment, the invention relates to a process according to either of the eighth and ninth embodiments, wherein the alkylene oxide is ethylene oxide and/or propylene oxide.

In an eleventh embodiment, the invention relates to a process according to the tenth embodiment, wherein the proportion by weight of propylene oxide is 80% by weight to 100% by weight based on the sum total of the masses of propylene oxide and of ethylene oxide metered in.

In a twelfth embodiment, the invention relates to a process according to any of the first to tenth embodiments, wherein the process is performed without addition of a solvent.

In a thirteenth embodiment, the invention relates to a polyoxyalkylene polyester polyol, preferably polyether polyester polyol and/or polyether carbonate polyester polyol, obtainable in accordance with any of the first to twelfth embodiments, wherein the polyoxyalkylene polyester polyol has a proportion of primary OH end groups of at least 80%, based on the sum total of primary and secondary OH end groups, wherein the primary OH end groups have been determined by means of 1H or 13C NMR spectroscopy as disclosed in the experimental section.

In a fourteenth embodiment, the invention relates to a polyoxyalkylene polyester polyol, preferably polyether polyester polyol and/or polyether carbonate polyester polyol, according to the thirteenth embodiment, wherein the polyoxyalkylene polyester polyol has a polydispersity index of ≤1.20, preferably ≤1.15, wherein the polydispersity index has been determined by means of gel permeation chromatography as disclosed in the experimental section.

In a fifteenth embodiment, the invention relates to a process for preparing a polyurethane by reaction of the polyoxyalkylene polyester polyol, preferably the polyether polyester polyol and/or the polyether carbonate polyester polyol, according to the thirteenth or fourteenth embodiment with a polyisocyanate.

EXAMPLES

The present invention is elucidated in more detail by the figures and examples which follow, but without being limited thereto.
Starting Materials Used
Cyclic Lactones
  β-Propiolactone (purity<98%, Acros Organics BVBA)
  ε-Caprolactone (purity<97%, Sigma-Aldrich)
Catalysts
  Trifluoromethanesulfonic acid (purity<99%, Acros Organics)
  DMC catalyst prepared in accordance with example 6 of WO 01/80994 A1
  Tin(II) 2-ethylhexanoate (purity 92.5-100%, Sigma-Aldrich)
Polyoxyalkylene Polyol (Polyether Polyol)
Polyether polyol A was prepared using DMC catalysis as follows:
  A 20 l pressure reactor was initially charged under nitrogen with 1739.3 g of a poly(oxypropylene) triol having an OH number of 233 mg KOH/g and 0.367 g of DMC catalyst (prepared in accordance with example 6 of WO 01/80994 A1). The reactor was heated to 130° C., inertized by three times evacuating to 100 mbar (absolute) and repeated charging with nitrogen, and then stripping was performed for 30 min at 100 mbar and 130° C. with the passage of nitrogen through the reactor. A mixture of 9256 g of propylene oxide and 1028 g of ethylene oxide was then metered in at 130° C. within three hours. After post-reaction time at 130° C. to constant pressure in the reactor, volatile constituents were distilled off under reduced pressure at 90° C. for 30 min and then the reaction mixture was cooled to room temperature. The OH number of the product was 34.3 mg KOH/g, the number-average molecular weight $M_n$ was 6665 g/mol, the polydispersity was 1.03 and the proportion of primary hydroxyl end groups was 18%.
Description of the Methods:
Gel Permeation Chromatography (GPC):
  The number-average molecular weight $M_n$ and the weight-average molecular weight $M_w$, and also the polydispersity ($M_w/M_n$), of the products were determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration.
$^1$H and $^{13}$C NMR Spectroscopy
  Determination of the molar proportion of primary OH groups: by means of $^1$H (Bruker AV III HD 600, 600 MHz, deuterochloroform) or $^{13}$C NMR (Bruker AV III HD 600, 151 MHz, deuterochloroform):

To determine the content of primary OH groups, the polyol samples were first peracetylated. This was done using the following peracetylation mixture:
  9.4 g of acetic anhydride p.a.
  1.6 g of acetic acid p.a.
  100 ml of pyridine p.a.
  For the peracetylation reaction, 10 g of polyol (polyoxyalkylene polyol or polyoxyalkylene polyester polyol) were weighed into a 300 ml flanged Erlenmeyer flask. The volume of peracetylation mixture was guided by the OH number of the polyol to be peracetylated, rounding the OH number of the polyol up to the next multiple of 10 (based in each case on 10 g of polyol); for every 10 mg KOH/g, 10 ml of peracetylation mixture are then added. For example, 50 ml of peracetylation mixture were correspondingly added to the sample of 10 g of a polyol having an OH number of 45.1 mg KOH/g.
  After the addition of glass boiling chips, the flanged Erlenmeyer flask was provided with a riser tube (air cooler) and the sample was boiled under gentle reflux for 75 min. The sample mixture was then transferred into a 500 ml round-bottom flask, and volatile constituents (essentially pyridine, acetic acid and excess acetic anhydride) were distilled off at 80° C. and 10 mbar (absolute) over a period of 30 min. The distillation residue was then admixed three times with 100 ml each time of cyclohexane (toluene was used as an alternative in the cases in which the distillation residue did not dissolve in cyclohexane), and volatile constituents of the sample were removed at 100° C. and 10 mbar (absolute) for one hour.
  For the determination of the molar proportions of primary and secondary OH end groups in the polyol, the sample thus prepared was dissolved in deuterated chloroform and analyzed using $^1$H NMR (Bruker AV III HD 600, 600 MHz) or $^{13}$C NMR (Bruker AV III HD 600, 151 MHz). The relevant resonances in the $^1$H NMR (based on TMS=0 ppm) are as follows:
  Methyl signal of a peracetylated secondary OH end group: 2.04 ppm
  Methyl signal of a peracetylated primary OH end group: 2.07 ppm
  The molar proportion of secondary and primary OH end groups is then found as follows:
  Proportion of secondary OH end groups (CH—OH)=F(2.04)/(F(2.04)+F(2.07))*100% (VII)
  Proportion of primary OH end groups (CH$_2$—OH)=F(2.07)/(F(2.04)+F(2.07))*100% (VIII)
  In the formulae (VII) and (VIII), F represents the area of the resonance at 2.04 ppm or 2.07 ppm, respectively.
  The relevant resonances in the $^{13}$C NMR (based on TMS=0 ppm) are as follows:
  Methyl signal of a peracetylated secondary OH end group: 21.3 ppm
  Methyl signal of a peracetylated primary OH end group: 20.8 ppm
  The molar proportion of secondary and primary OH end groups is then found as follows:
  Proportion of secondary OH end groups (CH—OH)=F(21.3)/(F(21.3)+F(20.8))*100% (IX)
  Proportion of primary OH end groups (CH$_2$—OH)=F(20.8)/(F(21.3)+F(20.8))*100% (X)
  In the formulae (IX) and (X), F represents the area of the resonance at 21.3 ppm or 20.8 ppm, respectively.
Infrared Spectroscopy
  The percentage lactone conversion, based on the amount of lactone used, was determined by means of IR spectroscopy. To this end, the product carbonyl band was analyzed (1740 cm$^{-1}$). The reference used was in each case the product carbonyl band of a sample having the same molar lactone/hydroxyl end group ratio and for which no characteristic lactone reactant bands (e.g. beta-propiolactone reactant carbonyl bands 1802 cm$^{-1}$, 1824 cm$^{-1}$) were observed and the lactone conversion of which was therefore set to 100%.

The percentage lactone conversion is then as follows:

$$X(\text{lactone})[\%]=F(1740)/F_{ref}(1740)*100\% \quad (XI)$$

In formula (XI), F is the area of the product carbonyl band at 1740 cm$^{-1}$ and $F_{ref}$ is the area of the product carbonyl band at 1740 cm$^{-1}$ of a reference sample having the same lactone/hydroxyl end group ratio and complete lactone conversion.

OH Numbers OH numbers were determined according to the method of DIN 53240.

Example 1

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.03 g of trifluoromethanesulfonic acid (0.08 mol % based on the total amount of the lactone used) was first added and then 5 g of beta-propiolactone were added. The reaction mixture was stirred at 60° C. for 2 hours. beta-Propiolactone was then added in portions of 5 g (last portion: 5.9 g) at intervals of 15 minutes (total amount of beta-propiolactone: 15.9 g; molar ratio of lactone/hydroxyl end groups of the polyether polyol A: 2/1). After lactone addition was complete, the reaction mixture was stirred for 30 min at 60° C. and then cooled to room temperature. A lactone conversion of 80% was determined by IR spectroscopy. The number-average molecular weight $M_n$ of the product is 7424 g/mol, the polydispersity is 1.11 and the proportion of primary hydroxyl end groups is 85%.

Example 2

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.04 g of trifluoromethanesulfonic acid (0.08 mol % based on the total amount of the lactone used) was first added and then 5 g of beta-propiolactone were added. The reaction mixture was stirred at 60° C. for 2 hours. beta-Propiolactone was then added in portions of 5 g (last portion: 6.2 g) at intervals of 15 minutes (total amount of beta-propiolactone: 26.2 g; molar ratio of lactone/hydroxyl end groups of the polyether polyol A: 3.3/1). After lactone addition was complete, the reaction mixture was stirred for 30 min at 60° C. and then cooled to room temperature. A lactone conversion of 95% was determined by IR spectroscopy. The number-average molecular weight $M_n$ of the product is 7782 g/mol, the polydispersity is 1.10 and the proportion of primary hydroxyl end groups is 89%.

Example 3

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.05 g of trifluoromethanesulfonic acid (0.08 mol % based on the total amount of the lactone used) was first added and then 5 g of beta-propiolactone were added. The reaction mixture was stirred at 60° C. for 2 hours. beta-Propiolactone was then added in portions of 5 g (last portion: 6.7 g) at intervals of 15 minutes (total amount of beta-propiolactone: 31.7 g; molar ratio of lactone/hydroxyl end groups of the polyether polyol A: 4/1). After lactone addition was complete, the reaction mixture was stirred for 30 min at 60° C. and then cooled to room temperature. A lactone conversion of 100% was determined by IR spectroscopy. The number-average molecular weight $M_n$ of the product is 8071 g/mol, the polydispersity is 1.11 and the proportion of primary hydroxyl end groups is 96%.

Example 4

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.05 g of trifluoromethanesulfonic acid (0.08 mol % based on the total amount of the lactone used) was first added and then 5 g of beta-propiolactone were added. The reaction mixture was stirred at 60° C. for 2 hours. beta-Propiolactone was then added in portions of 5 g (last portion: 6.7 g) at intervals of 1 hour (total amount of beta-propiolactone: 31.7 g; molar ratio of lactone/hydroxyl end groups of the polyether polyol A: 4/1). After lactone addition was complete, the reaction mixture was stirred for 30 min at 60° C. and then cooled to room temperature. A lactone conversion of 100% was determined by IR spectroscopy. The number-average molecular weight $M_n$ of the product is 8083 g/mol, the polydispersity is 1.10 and the proportion of primary hydroxyl end groups is 82%.

Example 5

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.17 g of trifluoromethanesulfonic acid (0.25 mol % based on the total amount of the lactone used) was first added and then 5 g of beta-propiolactone were added. The reaction mixture was stirred at 60° C. for 2 hours. beta-Propiolactone was then added in portions of 5 g (last portion: 6.7 g) at intervals of 1 hour (total amount of beta-propiolactone: 31.7 g; molar ratio of lactone/hydroxyl end groups of the polyether polyol A: 4/1). After lactone addition was complete, the reaction mixture was stirred for 30 min at 60° C. and then cooled to room temperature. A lactone conversion of 100% was determined by IR spectroscopy. The number-average molecular weight $M_n$ of the product is 7696 g/mol, the polydispersity is 1.05 and the proportion of primary hydroxyl end groups is 93%.

Example 6

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 100° C. and nitrogen was used to establish a reactor pressure of 1 bar (absolute). At 100° C., a mixture of 10 g of the polyether polyol A and 0.05 g of trifluoromethanesulfonic acid (0.08 mol % based on the total amount of the lactone used) was first added and then 5 g of beta-propiolactone were added. The reaction mixture was stirred at 100° C. for 2 hours. beta-Propiolactone was then added in portions of 5 g (last portion: 6.7 g) at intervals of 15 min (total amount of beta-propiolactone: 31.7 g; molar ratio of lactone/hydroxyl end groups of the polyether polyol A: 4/1). After lactone addition was complete, the reaction mixture was stirred for 30 min at 100° C. and then cooled to room temperature. A lactone conversion of 100% was determined by IR spectroscopy. The number-average molecular weight $M_n$ of the product is 8374 g/mol, the polydispersity is 1.14 and the proportion of primary hydroxyl end groups is 85%.

Example 7

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.05 g of trifluoromethanesulfonic acid (0.08 mol % based on the total amount of the lactone used) was first added and then 31.7 g of beta-propiolactone were added (corresponding to the total amount of beta-propiolactone; molar ratio of lactone/hydroxyl end groups of the polyether polyol A: 4/1). The reaction mixture was stirred at 60° C. for 2 hours and then cooled to room temperature. A lactone conversion of 94% was determined by IR spectroscopy. The number-average molecular weight $M_n$ of the product is 8133 g/mol, the polydispersity is 1.10 and the proportion of primary hydroxyl end groups is 85%.

Example 8

A 500-ml three-neck round-bottomed flask was initially charged with 180 g of the polyether polyol A, this was heated to 60° C., and 0.05 g of trifluoromethanesulfonic acid (0.08 mol % based on the total amount of the lactone used) was added. 31.7 g of beta-propiolactone (corresponding to the total amount of beta-propiolactone; molar ratio of lactone/hydroxyl end groups of the polyether polyol A: 4/1) were then added continuously over a period of 45 min. After lactone addition was complete, the reaction mixture was stirred for 75 min at 60° C. and then cooled to room temperature. A lactone conversion of 97% was determined by IR spectroscopy. The number-average molecular weight $M_n$ of the product is 8113 g/mol, the polydispersity is 1.11 and the proportion of primary hydroxyl end groups is 80%.

Example 9 (Comparative Example)

A 2-liter stainless steel reactor was initially charged with 200 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 100° C. and nitrogen was used to establish a reactor pressure of 1 bar (absolute). 5 g of beta-propiolactone were added and the reaction mixture was stirred at 100° C. for 2 hours. beta-Propiolactone was then added in portions of 5 g (last portion: 5.3 g) at intervals of 15 min (total amount of beta-propiolactone: 35.3 g; molar ratio of lactone/hydroxyl end groups of the polyether polyol A: 4/1). After lactone addition was complete, the reaction mixture was stirred for 30 min at 100° C. and then cooled to room temperature. A lactone conversion of 4% was determined by IR spectroscopy. The number-average molecular weight $M_n$ of the product is 6721 g/mol, the polydispersity is 1.03 and the proportion of primary hydroxyl end groups is 31%.

Example 10 (Comparative Example)

A 2-liter stainless steel reactor was initially charged with 200 g of the polyether polyol A and 0.18 g of DMC catalyst (prepared in accordance with example 6 in WO 01/80994 A1) and this mixture was heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 100° C. and nitrogen was used to establish a reactor pressure of 1 bar (absolute). 5 g of beta-propiolactone were added and the reaction mixture was stirred at 100° C. for 2 hours. beta-Propiolactone was then added in portions of 5 g (last portion: 5.3 g) at intervals of 15 min (total amount of beta-propiolactone: 35.3 g; molar ratio of lactone/hydroxyl end groups of the polyether polyol A: 4/1). After lactone addition was complete, the reaction mixture was stirred for 30 min at 100° C. and then cooled to room temperature. A lactone conversion of 5% was determined by IR spectroscopy. The number-average molecular weight $M_n$ of the product is 6666 g/mol, the polydispersity is 1.02 and the proportion of primary hydroxyl end groups is 28%.

Example 11 (Comparative Example)

A 2-liter stainless steel reactor was initially charged with 170 g of the polyether polyol A and heated to 130° C. The reactor was inertized by three times evacuating to 100 mbar (absolute) and repeated charging with nitrogen, and then stripping was performed for 30 min at 100 mbar and 130° C.

with the passage of nitrogen through the reactor. The reactor was then cooled to 60° C. and nitrogen was used to establish a reactor pressure of 1 bar (absolute). At 60° C., a mixture of 10 g of the polyether polyol A and 0.14 g of tin(II) 2-ethylhexanoate (0.08 mol % based on the total amount of the lactone used) was first added and then 5 g of beta-propiolactone were added. The reaction mixture was stirred at 60° C. for 2 hours. beta-Propiolactone was then added in portions of 5 g (last portion: 6.7 g) at intervals of 15 minutes (total amount of beta-propiolactone: 31.7 g; molar ratio of lactone/hydroxyl end groups of the polyether polyol A: 4/1). After lactone addition was complete, the reaction mixture was stirred for 30 min at 60° C. and then cooled to room temperature. A lactone conversion of 2% was determined by IR spectroscopy. The number-average molecular weight M of the product is 6675 g/mol, the polydispersity is 1.07 and the proportion of primary hydroxyl end groups is 12%.

Example 12 (Comparative Example)

A 2-liter stainless steel reactor was initially charged with 190 g of the polyether polyol A and heated to 130° C. The reactor was inertized by three times evacuating to 100 mbar (absolute) and repeated charging with nitrogen, and then stripping was performed for 30 min at 100 mbar and 130° C. with the passage of nitrogen through the reactor. The reactor was then cooled to 60° C. and nitrogen was used to establish a reactor pressure of 1 bar (absolute). At 60° C., a mixture of 10 g of the polyether polyol A and 0.16 g of tin(II) 2-ethylhexanoate (0.08 mol % based on the total amount of the lactone used) was first added and then 5 g of epsilon-caprolactone were added. The reaction mixture was stirred at 60° C. for 2 hours. epsilon-Caprolactone was then added in portions of 5 g (last portion: 5.8 g) at intervals of 15 minutes (total amount of epsilon-caprolactone: 55.8 g; molar ratio of lactone/hydroxyl end groups of the polyether polyol A: 4/1). After lactone addition was complete, the reaction mixture was stirred for 30 min at 60° C. and then cooled to room temperature. A lactone conversion of 0% was determined by IR spectroscopy. The number-average molecular weight $M_n$ of the product is 6675 g/mol, the polydispersity is 1.06 and the proportion of primary hydroxyl end groups is 13%.

TABLE 1

Comparison of experiments 1 to 12.

| Experiment | Addition of lactone[a] | Lactone[b] | Polyoxyalkylene polyol | Catalyst[c] | x(cat) [mol %][d] |
|---|---|---|---|---|---|
| 1 | sw | PL | Polyether polyol A | TfOH | 0.08 |
| 2 | sw | PL | Polyether polyol A | TfOH | 0.08 |
| 3 | sw | PL | Polyether polyol A | TfOH | 0.08 |
| 4 | sw | PL | Polyether polyol A | TfOH | 0.08 |
| 5 | sw | PL | Polyether polyol A | TfOH | 0.25 |
| 6 | sw | PL | Polyether polyol A | TfOH | 0.08 |
| 7 | batch | PL | Polyether polyol A | TfOH | 0.08 |
| 8 | cont. | PL | Polyether polyol A | TfOH | 0.08 |
| 9 (comp.) | sw | PL | Polyether polyol A | $DMC_{act}$ | — |
| 10 (comp.) | sw | PL | Polyether polyol A | $DMC_{act}$ + $DMC_{fresh}$ | — |
| 11 (comp.) | sw | PL | Polyether polyol A | Sn cat. | 0.08 |
| 12 (comp.) | sw | CL | Polyether polyol A | Sn cat. | 0.08 |

| Experiment | Lactone/hydroxyl end groups of the polyoxy-alkylene polyol [mol/mol] | T [° C.] | X(lactone) [%] | Primary OH end groups [%] | $M_n$ [g/mol] | PDI |
|---|---|---|---|---|---|---|
| 1 | 2/1 | 60 | 80 | 85 | 7424 | 1.11 |
| 2 | 3.3/1 | 60 | 95 | 89 | 7782 | 1.10 |
| 3 | 4/1 | 60 | 100 | 96 | 8071 | 1.11 |
| 4 | 4/1 | 60 | 100 | 82 | 8083 | 1.10 |
| 5 | 4/1 | 60 | 100 | 93 | 7696 | 1.05 |
| 6 | 4/1 | 100 | 100 | 85 | 8374 | 1.14 |
| 7 | 4/1 | 60 | 94 | 85 | 8133 | 1.10 |
| 8 | 4/1 | 60 | 97 | 80 | 8113 | 1.11 |
| 9 (comp.) | 4/1 | 100 | 4 | 31 | 6721 | 1.03 |
| 10 (comp.) | 4/1 | 100 | 5 | 28 | 6666 | 1.02 |
| 11 (comp.) | 4/1 | 60 | 2 | 12 | 6775 | 1.07 |
| 12 (comp.) | 4/1 | 60 | 0 | 13 | 6776 | 1.06 |

[a]Lactone addition: semi-batch mode with stepwise lactone addition (sw); batch mode (batch); semi-batch mode with continuous lactone addition (cont.)
[b]beta-Propiolactone (PL), epsilon-caprolactone (CL)
[c]Trifluoromethanesulfonic acid (TfOH); DMC catalyst present from the preparation of the polyether polyol A ($DMC_{act}$); DMC catalyst added to the polyether polyol A ($DMC_{fresh}$); tin(II) 2-ethylhexanoate (Sn cat.)
[d]Based on the amount of lactone used

The invention claimed is:

1. A process for preparing a polyoxyalkylene polyester polyol comprising reacting a polyoxyalkylene polyol with a lactone comprising beta-propiolactone in the presence of a Brønsted-acidic catalyst;
   wherein the catalyst has a pKa of 1 or less; and
   wherein the number-average molar mass of the polyoxyalkylene polyol is ≥1000 g/mol;
   wherein the polyoxyalkylene polyol has a proportion of secondary OH end groups of at least 75%, based on the sum total of primary and secondary OH end groups, as determined by means of 1H NMR spectroscopy; and
   wherein the polyoxyalkylene polyester polyol has a proportion of primary OH end groups of at least 80%, based on the sum total of primary and secondary OH end groups, as determined by means of 1H or 13C NMR spectroscopy.

2. The process as claimed in claim 1, wherein the molar ratio of lactone to the hydroxyl end groups of the polyoxyalkylene polyol is 1:1 to 20:1.

3. The process as claimed in claim 1, wherein the Brønsted-acidic catalyst comprises trifluoromethanesulfonic acid, perchloric acid, hydrochloric acid, hydrobromic acid, hydroiodic acid, sulfuric acid, nitric acid, methanesulfonic acid, trichloroacetic acid, trifluoroacetic acid, or a mixture thereof.

4. The process as claimed in claim 1, wherein the Brønsted-acidic catalyst is used in an amount of 0.001 mol % to 0.5 mol %, based on the amount of lactone.

5. The process as claimed in claim 1, wherein the polyoxyalkylene polyol comprises a polyether polyol and/or polyether carbonate polyol.

6. The process as claimed in claim 5, wherein the polyoxyalkylene polyol comprises a polyether polyol prepared by reaction of an H-functional starter substance with alkylene oxide in the presence of a double metal cyanide catalyst.

7. The process as claimed in claim 5, wherein the polyoxyalkylene polyol comprises a polyether carbonate polyol prepared by reaction of an H-functional starter substance with alkylene oxide and carbon dioxide in the presence of a double metal cyanide catalyst.

8. The process as claimed in claim 6, wherein the alkylene oxide is ethylene oxide and/or propylene oxide.

9. The process as claimed in claim 8, wherein the proportion by weight of propylene oxide is 80% by weight to 100% by weight based on the sum total of the masses of propylene oxide and of ethylene oxide metered in.

10. The process as claimed in claim 1, wherein the process is performed without addition of a solvent.

11. The process as claimed in claim 2, wherein the molar ratio of lactone to the hydroxyl end groups of the polyoxyalkylene polyol is 2:1 to 6:1 and the Brønsted-acidic catalyst is used in an amount of 0.005 mol % to 0.3 mol %, based on the amount of lactone.

12. The process as claim in claim 11, wherein the Brønsted-acidic catalyst comprises trifluoromethanesulfonic acid.

* * * * *